(12) United States Patent
Takagi et al.

(10) Patent No.: US 8,585,508 B1
(45) Date of Patent: Nov. 19, 2013

(54) NON-TRANSITORY COMPUTER-READABLE STORAGE MEDIUM AND INFORMATION PROCESSING DEVICE

(71) Applicant: DeNA Co., Ltd., Tokyo (JP)

(72) Inventors: Yuzo Takagi, Tokyo (JP); Takehiro Kusano, Tokyo (JP); Satoshi Sekiguchi, Tokyo (JP); Wataru Takahashi, Tokyo (JP); Yuuki Abe, Tokyo (JP); Minehiro Nagata, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 13/734,649

(22) Filed: Jan. 4, 2013

(30) Foreign Application Priority Data

May 31, 2012 (JP) ................................ 2012-124766

(51) Int. Cl.
*G07F 17/32* (2006.01)
(52) U.S. Cl.
USPC .................................. 463/42; 463/29; 463/43
(58) Field of Classification Search
USPC .......................................... 463/23, 29, 42, 43
See application file for complete search history.

(56) References Cited

U.S. PATENT DOCUMENTS

2006/0040746 A1* 2/2006 Eguchi et al. ................... 463/43

FOREIGN PATENT DOCUMENTS

| JP | 2008-264183 A | 11/2008 |
|---|---|---|
| JP | 4855549 B1 | 1/2012 |
| JP | 2012005652 A | 1/2012 |

OTHER PUBLICATIONS

Sasaki et al. "professional baseball card stadium, your all-star game, walk-through guide, Official Book, the 2010 edition", Fusosha Publishing Inc., First published on Sep. 1, 2010, p. 006-007, 036-037, and 054-062, 16 pages.
Kobayashi et al. "World Destruction,—Guided Wills—, complete guide", Enterbrain. Inc., First published on Nov. 6, 2008, p. 030-035, 9 pages.
Japanese Office Action dated Aug. 28, 2012, issued in Japanese Patent Application No. 2012-124766, 7 pages.
Notification of Reasons for Rejection dated Jun. 25, 2013, issued in Japanese Patent Application No. 2013-024496, 7 pages.
Studio BentStuff Co., Ltd. "Vagrant Story" Ultimania, DigiCube Co., Ltd., first published on Apr. 13, 2000, 8 pages.
Murakami et al. Estpolis, Official Complete Guide, Square Enix, Co., Ltd., first published on Mar. 11, 2010, 4 pages.

* cited by examiner

*Primary Examiner* — Omkar Deodhar
(74) *Attorney, Agent, or Firm* — Rothwell, Figg, Ernst & Manbeck, P.C.

(57) ABSTRACT

A computer-readable storage medium non-transitorily storing a game program for causing a computer that includes a processor and a memory to execute a game played by a player using a game content for which a parameter that can be increased to an upper limit value is set, the game program causing the computer to perform the following processes:
an offer process of offering the player with the game content;
a recording process of recording the offered game content as an owned game content that the player owns; and
an upper limit setting process of selecting one owned game content and another owned game content set to the same type as the one owned game content from among a plurality of owned game contents that the player owns, and re-setting an upper limit value of a parameter set for the one owned game content to a new upper limit value by combining the one owned game content with the other owned game content.

6 Claims, 9 Drawing Sheets

| CARD ID | CHARACTER NAME | CHARACTER IMAGE | RARITY | LEVEL UPPER LIMIT VALUE PER ADVANCEMENT | | ATTACK POWER UPPER LIMIT VALUE PER ADVANCEMENT | | DEFENSE POWER UPPER LIMIT VALUE PER ADVANCEMENT | |
|---|---|---|---|---|---|---|---|---|---|
| 0001 | WARRIOR A | 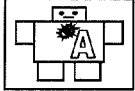 | COMMON | FIRST | LV.20 | FIRST | 120 | FIRST | 60 |
| | | | | SECOND | LV.40 | SECOND | 150 | SECOND | 80 |
| | | | | THIRD | LV.60 | THIRD | 180 | THIRD | 100 |
| 0002 | WARRIOR A | 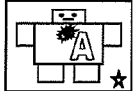 | UNCOMMON | FIRST | LV.30 | FIRST | 150 | FIRST | 100 |
| | | | | SECOND | LV.50 | SECOND | 200 | SECOND | 150 |
| | | | | THIRD | LV.70 | THIRD | 250 | THIRD | 200 |
| 0003 | WARRIOR A | 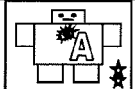 | RARE | FIRST | LV.40 | FIRST | 800 | FIRST | 450 |
| | | | | SECOND | LV.60 | SECOND | 1000 | SECOND | 600 |
| | | | | THIRD | LV.80 | THIRD | 1200 | THIRD | 750 |
| 0004 | WARRIOR A | 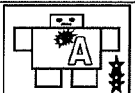 | SUPER RARE | FIRST | LV.50 | FIRST | 1500 | FIRST | 1500 |
| | | | | SECOND | LV.70 | SECOND | 2000 | SECOND | 1800 |
| | | | | THIRD | LV.90 | THIRD | 2500 | THIRD | 2100 |
| 0011 | WARRIOR B | 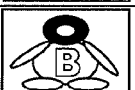 | COMMON | FIRST | LV.20 | FIRST | 70 | FIRST | 30 |
| | | | | SECOND | LV.40 | SECOND | 100 | SECOND | 50 |
| | | | | THIRD | LV.60 | THIRD | 130 | THIRD | 70 |
| 0012 | WARRIOR B | 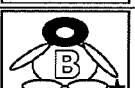 | UNCOMMON | FIRST | LV.30 | FIRST | 100 | FIRST | 50 |
| | | | | SECOND | LV.50 | SECOND | 150 | SECOND | 100 |
| | | | | THIRD | LV.70 | THIRD | 200 | THIRD | 150 |
| 0013 | WARRIOR B | 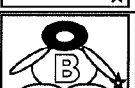 | RARE | FIRST | LV.40 | FIRST | 600 | FIRST | 350 |
| | | | | SECOND | LV.60 | SECOND | 800 | SECOND | 500 |
| | | | | THIRD | LV.80 | THIRD | 1000 | THIRD | 650 |
| . | . | . | . | . | . | . | . | . | . |
| . | . | . | . | . | . | . | . | . | . |
| . | . | . | . | . | . | . | . | . | . |
| 2591 | WIZARD Z |  | COMMON | FIRST | LV.20 | FIRST | 180 | FIRST | 280 |
| | | | | SECOND | LV.40 | SECOND | 200 | SECOND | 300 |
| | | | | THIRD | LV.60 | THIRD | 220 | THIRD | 320 |
| 2592 | WIZARD Z |  | UNCOMMON | FIRST | LV.30 | FIRST | 450 | FIRST | 700 |
| | | | | SECOND | LV.50 | SECOND | 500 | SECOND | 750 |
| | | | | THIRD | LV.70 | THIRD | 550 | THIRD | 800 |
| 2593 | WIZARD Z |  | RARE | FIRST | LV.40 | FIRST | 400 | FIRST | 800 |
| | | | | SECOND | LV.60 | SECOND | 600 | SECOND | 1000 |
| | | | | THIRD | LV.80 | THIRD | 800 | THIRD | 1200 |
| 2594 | WIZARD Z |  | SUPER RARE | FIRST | LV.50 | FIRST | 1000 | FIRST | 2500 |
| | | | | SECOND | LV.70 | SECOND | 1500 | SECOND | 3000 |
| | | | | THIRD | LV.90 | THIRD | 2000 | THIRD | 3500 |

FIG. 6

| USER ID | FRIEND USER ID | VIRTUAL CURRENCY | OWNED CARD INFORMATION |
|---|---|---|---|
| 1 | 5, 8 | 0 | OWNED CARD INFORMATION (1) |
| 2 | NONE | 500 | OWNED CARD INFORMATION (2) |
| 3 | 4, 6 | 700 | OWNED CARD INFORMATION (3) |
| 4 | 3, 6 | 1000 | OWNED CARD INFORMATION (4) |
| 5 | 1, 6 | 100 | OWNED CARD INFORMATION (5) |
| 6 | 3, 4, 5 | 3000 | OWNED CARD INFORMATION (6) |
| . | . | . | . |
| . | . | . | . |
| . | . | . | . |

FIG. 7

OWNED CARD INFORMATION (3)
OWNED CARD INFORMATION (2)
OWNED CARD INFORMATION (1)

| OWNED CARD ID | LEVEL (CURRENT VALUE) | LEVEL (UPPER LIMIT VALUE) | ATTACK POWER (CURRENT VALUE) | ATTACK POWER (UPPER LIMIT VALUE) | DEFENSE POWER (CURRENT VALUE) | DEFENSE POWER (UPPER LIMIT VALUE) |
|---|---|---|---|---|---|---|
| 0011 | LV. 3 | LV. 20 | 15 | 80 | 10 | 60 |
| 0211 | LV. 4 | LV. 60 | 20 | 100 | 23 | 80 |
| 0133 | LV. 1 | LV. 30 | 70 | 70 | 45 | 100 |
| 0201 | LV. 4 | LV. 40 | 22 | 120 | 40 | 80 |
| 0072 | LV. 7 | LV. 20 | 60 | 350 | 50 | 120 |
| 0094 | LV. 1 | LV. 90 | 300 | 300 | 200 | 300 |
| . | . | . | . | . | . | . |
| . | . | . | . | . | . | . |
| . | . | . | . | . | . | . |

FIG. 8

NON-TRANSITORY COMPUTER-READABLE STORAGE MEDIUM AND INFORMATION PROCESSING DEVICE

CROSS-REFERENCE TO RELATED APPLICATIONS

The present application claims priority upon Japanese Patent Application No. 2012-124766 filed on May 31, 2012, which is herein incorporated by reference.

BACKGROUND

1. Technical Field

This invention relates to a non-transitory computer-readable storage medium, and an information processing device.

2. Related Art

A game program is known for causing a computer to execute a game played by a player using game contents such as character cards (for example, Japanese Laid-Open Patent Publication No. 2008-264183). This game program causes a computer to execute an offer process to offer a player with a game content used in the game. When the execution of this offer process offers a player with a game content of the same type as a game content that the player already owns, there has been little advantage in owning redundant game contents of the same type.

SUMMARY OF THE INVENTION

The present invention has been made in view of the above-described issue, and an object thereof is to achieve greater advantages in owning redundant game contents of the same type.

As aspect of the invention to solve the above problem is a computer-readable storage medium non-transitorily storing a game program for causing a computer that includes a processor and a memory to execute a game played by a player using a game content for which a parameter that can be increased to an upper limit value is set, the game program causing the computer to perform the following processes:

an offer process of offering the player with the game content;

a recording process of recording the offered game content as an owned game content that the player owns; and an upper limit setting process of selecting one owned game content and another owned game content set to the same type as the one owned game content from among a plurality of owned game contents that the player owns, and re-setting an upper limit value of a parameter set for the one owned game content to a new upper limit value by combining the one owned game content with the other owned game content.

Other features of the present invention will become apparent from the detailed description in this specification and the attached drawings.

BRIEF DESCRIPTION OF DRAWINGS

FIG. 6 is a diagram showing an example of a data structure of card information.

FIG. 7 is a diagram showing an example of a data structure of user information.

FIG. 8 is a diagram showing an example of a data structure of owned card information.

DETAILED DESCRIPTION OF THE INVENTION

Figure 1:
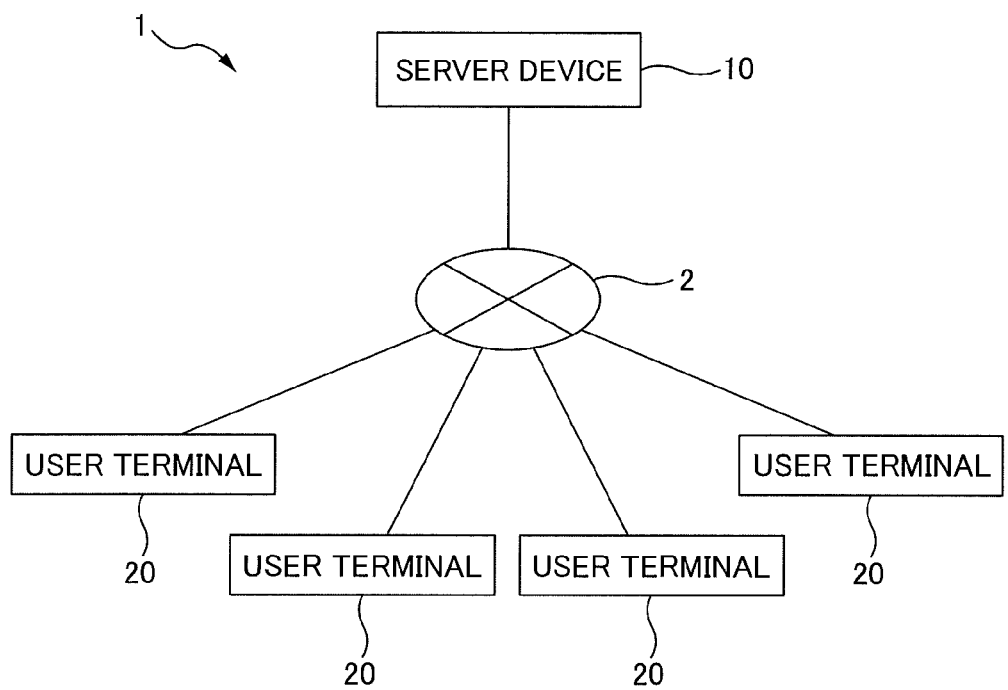
FIG. 1 a diagram showing an example of an overall configuration of a game system 1 according to the present embodiment.

With the detailed description of the present invention and the accompanied drawings, at least the following matters will be apparent.

A computer-readable storage medium non-transitorily storing a game program for causing a computer that includes a processor and a memory to execute a game played by a player using a game content for which a parameter that can be increased to an upper limit value is set, the game program causing the computer to perform the following processes:

an offer process of offering the player with the game content;

a recording process of recording the offered game content as an owned game content that the player owns; and an upper limit setting process of selecting one owned game content and another owned game content set to the same type as the one owned game content from among a plurality of owned game contents that the player owns, and re-setting an upper limit value of a parameter set for the one owned game content to a new upper limit value by combining the one owned game content with the other owned game content.

According to such computer-readable storage medium, the upper limit value of the parameter set for owned game contents of the same type can be re-set to a new upper limit value, thereby making it possible to achieve greater advantages in owning redundant game contents of the same type.

In such a computer-readable storage medium, it is acceptable that the game program causes the computer to execute:

a parameter increasing process of increasing a current value of the parameter set for the one owned game content by combining the one owned game content with another owned game content set to a different type from the one owned game content.

According to such computer-readable storage medium, the current value of the parameter set for an owned game content can be increased using an owned game content of a different type, thus making it possible to achieve even greater advantages in owning redundant game contents of the same type.

In such a computer-readable storage medium, it is acceptable that the game program causes the computer to execute:

a process of determining an amount of increase in the parameter of the one owned game content based on a current value of the parameter of the other owned game content set to a different type in the parameter increasing process.

According to such computer-readable storage medium, the amount of increase in the current value of the parameter set for owned game contents of the same type can be determined in accordance with the current value of the parameter set for an owned game content of a different type, thus making it possible to achieve even greater advantages in owning redundant game contents of the same type.

In such a computer-readable storage medium, it is acceptable that the game program causes the computer to execute:

a process of increasing a current value of the parameter of the one owned game content when the upper limit value of the parameter of the one owned game content is re-set to the new upper limit value due to execution of the upper limit setting process.

According to such computer-readable storage medium, the current value of the parameter set for owned game contents of the same type can also be increased, thus making it possible to achieve even greater advantages in owning redundant game contents of the same type.

In such a computer-readable storage medium, it is acceptable that in the game program, the number of times that the one owned game content can be combined with another owned game content set to the same type as the one owned game content is limited to a predetermined number of times or less.

According to such computer-readable storage medium, greater advantages in owning redundant game contents of the same type can be achieved within a limited extent by suppressing the excessive combining of owned game contents set to the same type.

In such a computer-readable storage medium, it is acceptable that the game program causes the computer to execute:

a process of performing control so that the higher the current value of the parameter set for the one owned game content is, the more the new upper limit value of the parameter to be re-set for the one owned game content increases in the upper limit setting process.

According to such computer-readable storage medium, a player is allowed to hold owned game contents of the same type until the current value of the parameter increases.

Moreover, an information processing device for executing a game played by a player using a game content for which a parameter that can be increased to an upper limit value is set, comprising:

an offer unit that offers the player with the game content;

a recording unit that records the offered game content as an owned game content that the player owns; and an upper limit setting unit that selects one owned game content and another owned game content set to the same type as the one owned game content from among a plurality of owned game contents that the player owns, and re-sets an upper limit value of a parameter set for the one owned game content to a new upper limit value by combining the one owned game content with the other owned game content.

According to such information processing device, the upper limit value of the parameter set for owned game contents of the same type can be re-set to a new upper limit value, thus making it possible to achieve greater advantages in owning redundant game contents of the same type.

Present Embodiment

Configuration of Game System 1

FIG. 1 is a diagram showing an example of an overall configuration of a game system 1 according to the present embodiment. The game system 1 according to the present embodiment provides various types of services related to games to a user who has been registered as a member (also referred to as "player") over a network 2. The user can play a game transmitted over the network 2 by accessing the game system 1. The user can also register other users as friends on a friend list by accessing the game system 1. In this way, the game system 1 encourages communication between a plurality of users by allowing the users to play games and exchange messages with users who have become friends.

The game system 1 according to the present embodiment includes a server device 10 and a plurality of user terminals 20 (also referred to as "player terminals"). The server device 10 and the user terminals 20 are each connected to the network 2 and are able to communicate with each other. The network 2 is, for example, the Internet, a local area network (LAN), or a value added network (VAN) established by Ethernet (trademark) or a public telephone line network, a wireless network, a mobile telephone network, or the like.

The server device 10 is an information processing device (computer that includes a processor and a memory) used by, for example, a system administrator when managing and controlling the game service. The server device 10 is, for example, a workstation or personal computer and is able to distribute various types of information to the user terminals 20 in response to various types of commands (requests) transmitted from those user terminals 20. When a distribution request for contents is received from a user terminal 20 used by a user playing a game, the server device 10 according to the present embodiment is able to distribute the contents, such as a game program that is operable on the user terminal 20 and a web page generated by a mark-up language (HTML and the like) suited to the standards of the user terminal, in accordance with the request.

The user terminal 20 is an information processing device (computer that includes a processor and a memory) used by a user when playing a game. The user terminal 20 may be, for example, a mobile telephone terminal, a smartphone, a personal computer, a game device or the like, and is able to send a distribution request for various types of game-related information (e.g., contents such as game programs and web pages) to the server device 10 that is accessible over the network 2. The user terminal 20 also has a web browser function to allow users to view web pages. Therefore, when web pages (e.g., game play images) linked to, for example, image data related to a game are distributed from the server device 10, the user terminals 20 are able to display the web pages on screens.

<<<Configuration of Server Device 10>>>

Figure 2:
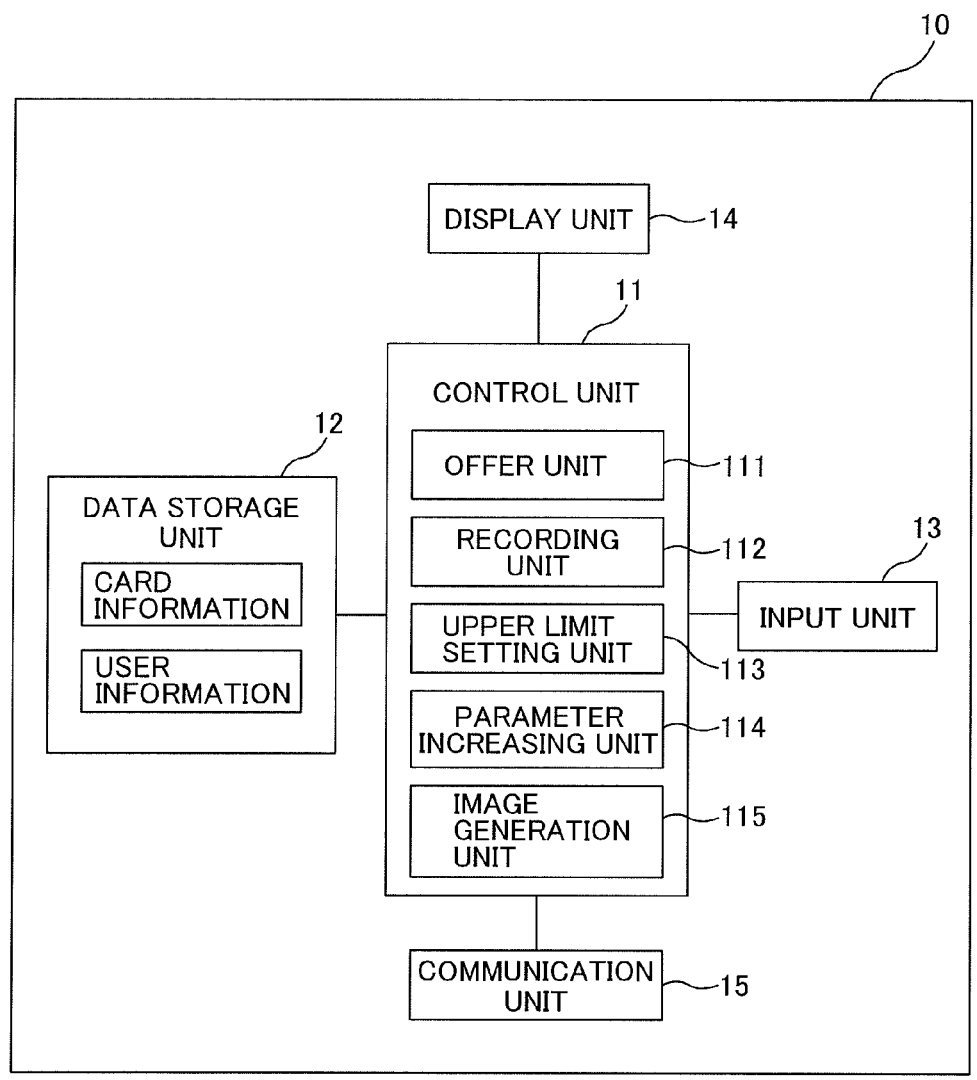
FIG. 2 is a block diagram showing a functional configuration of a server device 10 according to the present embodiment.

FIG. 2 is a block diagram illustrating the functional configuration of the server device 10. The server device 10 according to the present embodiment includes a control unit 11, a data storage unit 12, an input unit 13, a display unit 14, and a communication unit 15.

The control unit 11 is a unit that transfers data among the units and performs overall control of the server device 10, and is realized by a central processing unit (CPU) executing a program stored in a predetermined memory. Specifically, the control unit 11 has a function to execute various types of controls and information processes related to the game system 1, such as various types of processes for providing a game service and various types of processes for addressing requests from the user terminals 20. To be more specific, the control unit 11 according to the present embodiment includes an offer unit 111, a recording unit 112, an upper limit setting unit 113, a parameter increasing unit 114, and an image generation unit 115 as shown in FIG. 2.

The offer unit 111 has a function to execute a process for offering a player (user) with a game content used in a game. Here, "game content" refers to a digital content such as a game card, a figure, or the like associated with a character. Note that a game content that a player is offered with becomes an owned game content that is owned by that player. In the present embodiment, a player is offered with a game content in cases such as victory over an enemy character in a later-described battle game, and success of an event that occurred.

The recording unit 112 is connected to the data storage unit 12 via a bus, and has a function to execute a process for recording data to the data storage unit 12 in accordance with a command from the control unit 11.

The upper limit setting unit 113 has a function to execute a process in which the upper limit value of a parameter set for an owned game content is re-set to a new upper limit value.

In the upper limit setting unit 113 according to the present embodiment, one owned game content selected from among a plurality of owned game contents owned by a player (user) is combined with another owned game content that is set to the same type, and thus the upper limit value of the parameter set for the one owned game content is re-set to a new upper limit value.

The upper limit setting unit 113 according to the present embodiment can also perform control such that the higher the current value of the parameter set for the one owned game content is, the more the new upper limit value of the parameter that is to be re-set for the one owned game content increases.

The parameter increasing unit 114 has a function to execute a process for increasing the current value of the parameter (e.g., level, attack power, or defense power) set for an owned game content.

The parameter increasing unit 114 according to the present embodiment selects one owned game content from among a plurality of owned game contents owned by a player (user), and increases the current value of the parameter set for the one owned game content when the one owned game content is combined with another owned game content that is set to a different type.

At this time, the parameter increasing unit 114 can determine the amount of increase in the parameter of the one owned game content based on the current value of the parameter of the other owned game content that is set to a different type.

The parameter increasing unit 114 according to the present embodiment can also increase the current value of the parameter of the one owned game content when the upper limit value of the parameter set for the one owned game content has been re-set to a new upper limit value by the upper limit setting unit 113.

The image generation unit 115 has a function to execute a process for generating various types of image data such as a task image that allows players (users) to play a game and game images including a character and the like.

The data storage unit 12 has a read only memory (ROM) that is a read-only storage region in which system programs for the server device 10 are stored, and a random access memory (RAM) that is a rewritable storage region in which various types of data (flags and computed values used by the system programs) generated by the control unit 11 are stored and which is used as a work area for computing processes performed by the control unit 11. The data storage unit 12 is realized, for example, by a non-volatile storage device such as a flash memory, a hard disk, or the like. The data storage unit 12 according to the present embodiment stores card information that is information related to a game card used by a user (player) in a game, user information that is information related to the user (player), and the like. These types of information will be described later in detail.

The input unit 13 is a unit for a system administrator or the like to input various types of data (e.g., the later-described card information), and is realized by a keyboard, a mouse, and the like.

The display unit 14 is a unit which displays operating screens for the system administrator on the basis of commands from the control unit 11, and is realized by a liquid crystal display (LCD) or the like.

The communication unit 15 is a unit for performing communication with the user terminals 20, and has a function as a reception unit for receiving signals and various types of data transmitted from the user terminals 20, and a function as a transmission unit for transmitting signals and various types of data to the user terminals 20 in accordance with commands from the control unit 11. The communication unit 15 is realized by a network interface card (NIC) or the like.

<<<Configuration of User Terminal 20>>>

Figure 3:
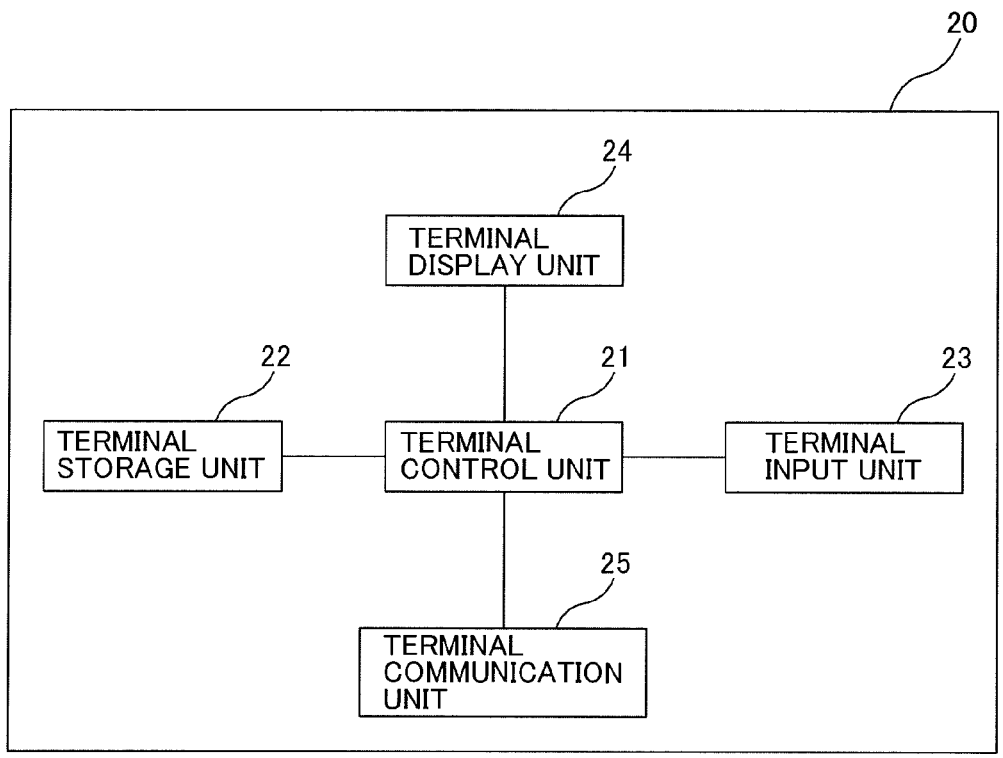
FIG. 3 is a block diagram showing a functional configuration of a user terminal 20 according to the present embodiment.

FIG. 3 is a block diagram illustrating the functional configuration of a user terminal 20. The user terminal 20 according to the present embodiment includes a terminal control unit 21, a terminal storage unit 22, a terminal input unit 23, a terminal display unit 24, and a terminal communication unit 25.

The terminal control unit 21 is a unit that transfers data among the units and performs overall control of the user terminal 20, and is realized by a central processing unit (CPU) executing a program stored in a predetermined memory. Specifically, the terminal control unit 21 has functions to execute various types of controls and information processes related to the game system 1, such as various types of processes for accessing a game site, and various types of processes for sending requests to the server device 10.

The terminal storage unit 22 has a read only memory (ROM) that is a read-only storage region in which system programs for the user terminal 20 are stored, and a random access memory (RAM) that is a rewritable storage region in which various types of data (flags and computed values used by the system programs) generated by the terminal control unit 21 are stored and which is used as a work area for computing processes performed by the terminal control unit 21. The terminal storage unit 22 is realized by a non-volatile storage device such as a flash memory, a hard disk, or the like. The terminal storage unit 22 is connected to the terminal control unit 21 via a bus, and the data stored in the terminal storage unit 22 is looked up, read, and rewritten in accordance with commands from the terminal control unit 21. In the present embodiment, contents such as user IDs, and game programs and game data transmitted from the server device 10 and the like are recorded in the terminal storage unit 22.

The terminal input unit 23 is a unit with which the user performs various types of operations (game operations, text input operations, and the like), and is realized by operating buttons, a touch panel, or the like.

The terminal display unit 24 is a unit for displaying a game screen (game play image) generated on the basis of game information in accordance with commands from the terminal control unit 21, and is realized by a liquid crystal display (LCD) or the like.

The terminal communication unit 25 is a unit that performs communication with the server device 10, and has a function as a reception unit for receiving signals and various types of data transmitted from the server device 10, and a function as a transmission unit for transmitting signals and various types of data to the server device 10 in accordance with commands from the terminal control unit 21. The terminal communication unit 25 is realized by a network interface card (NIC) or the like.

<<<Game Outline>>>

Figure 4:
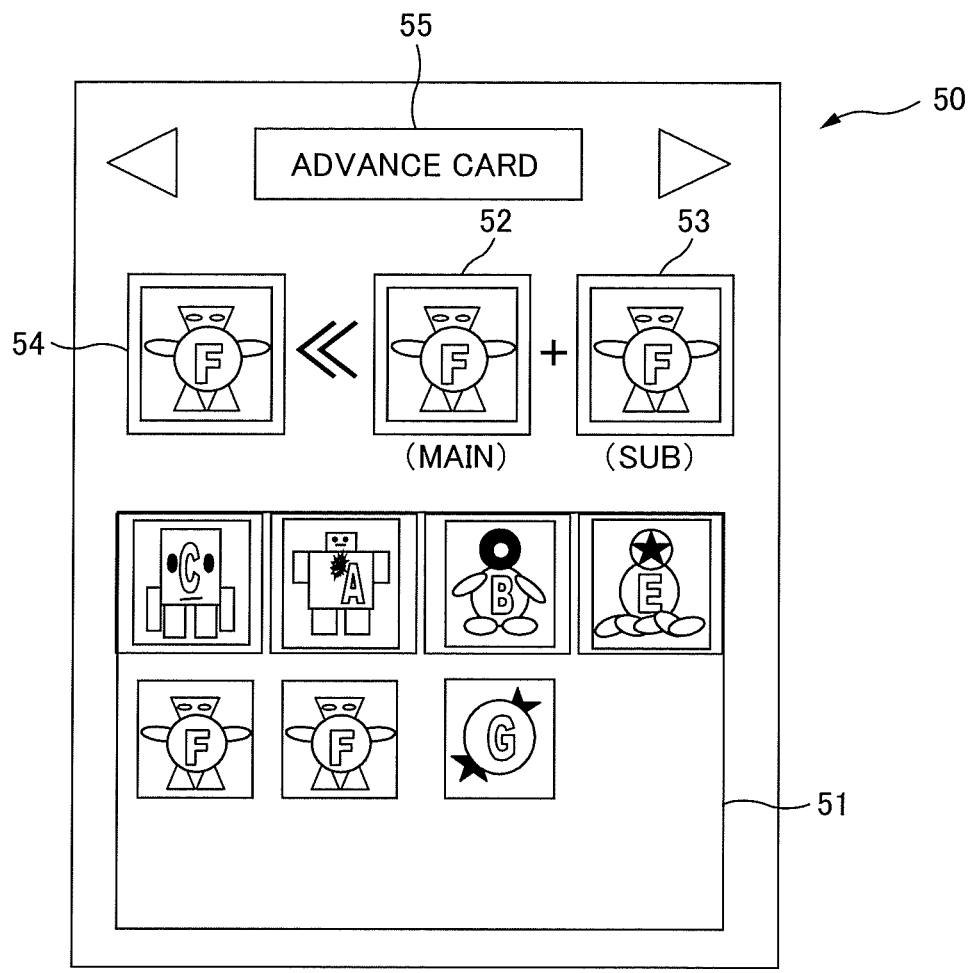
FIG. 4 is a diagram showing an example of a game image when a game card is advanced.
Figure 5:
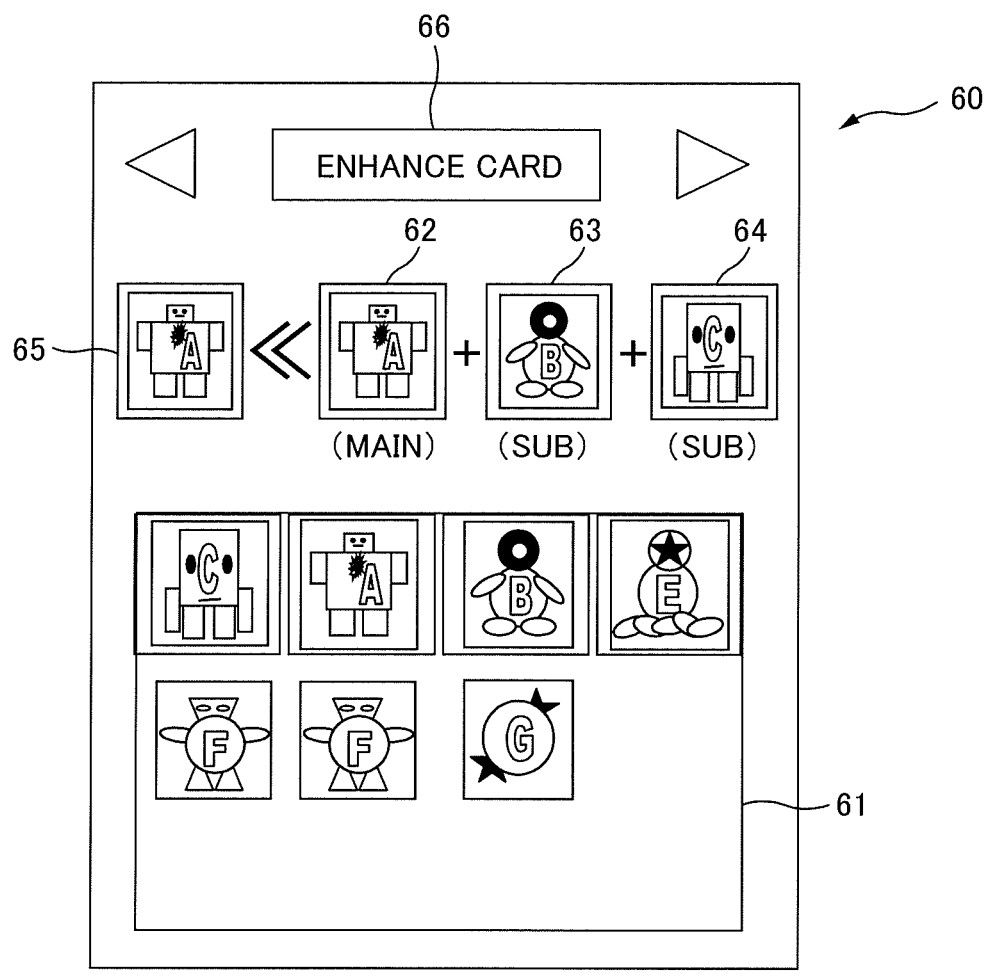
FIG. 5 is a diagram showing an example of a game image when a game card is enhanced.
Figure 9:
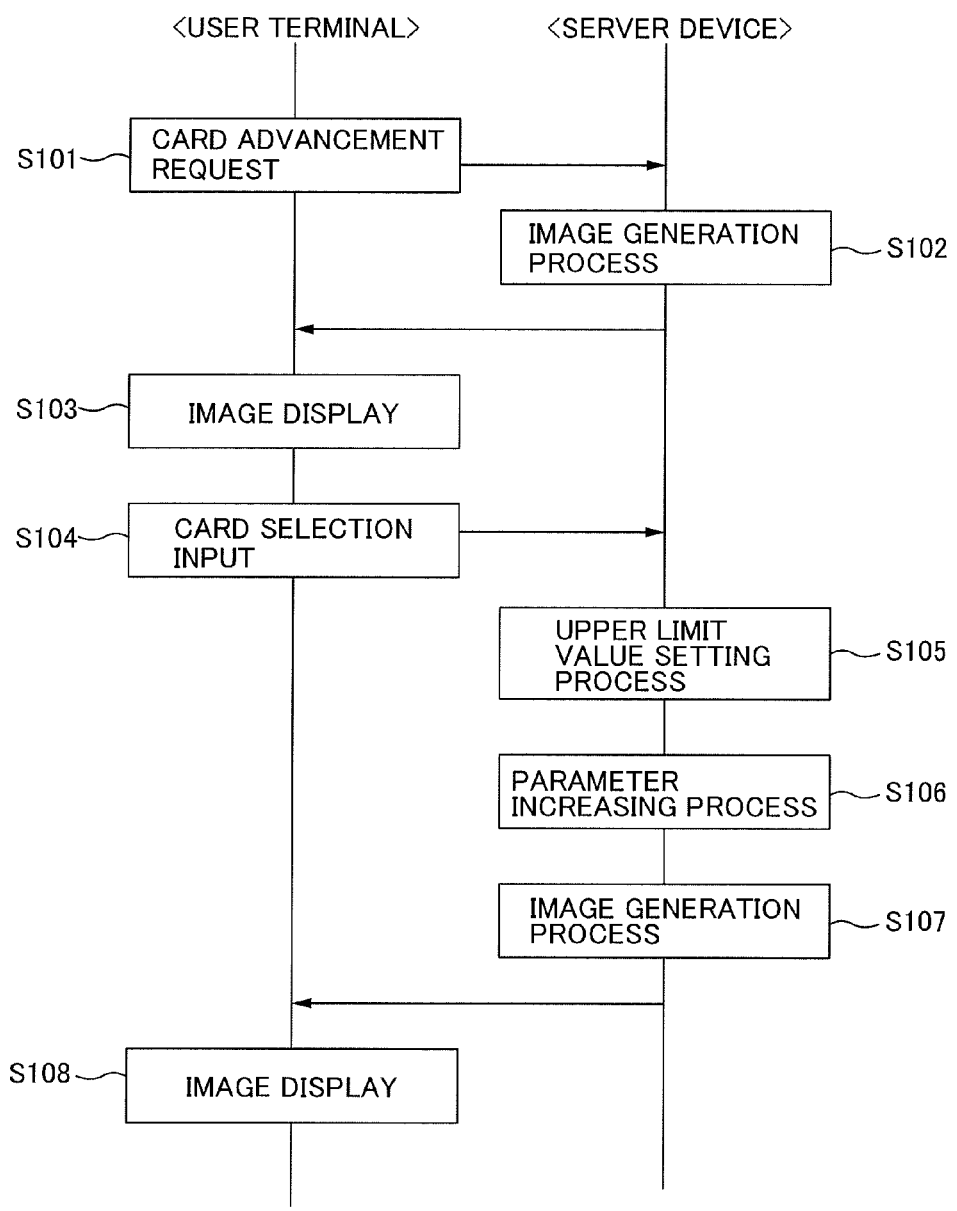
FIG. 9 is a flowchart for describing an operation example of a card advancement in the game system 1 according to the present embodiment.
Figure 10:
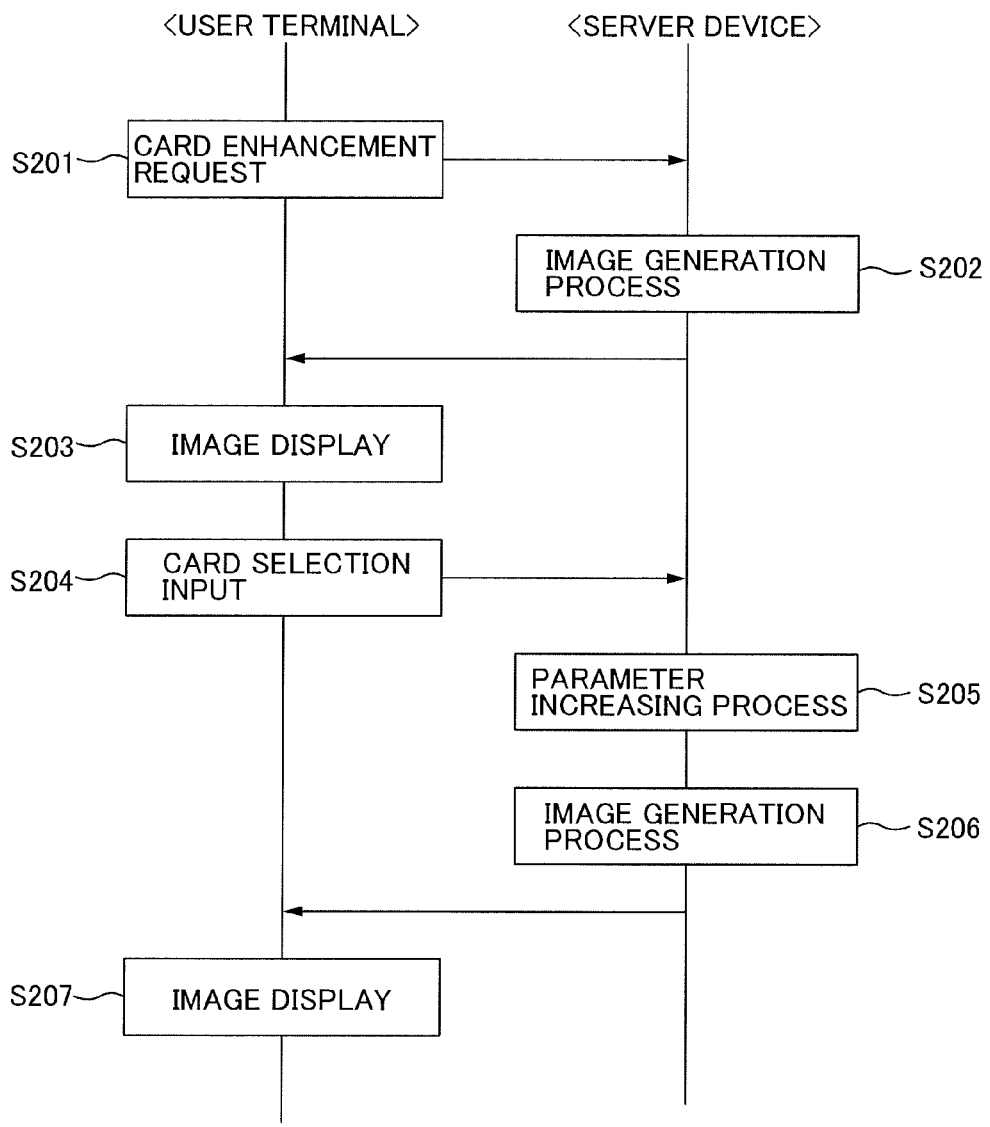
FIG. 10 is a flowchart describing an operation example of a card enhancement in the game system 1 according to the present embodiment.

An outline of the game provided by the game system 1 will now be described with reference to FIGS. 4 and 5. FIG. 4 illustrates an example of a game image when a game card is advanced. FIG. 5 illustrates an example of a game image when a game card is enhanced.

The game system 1 according to the present embodiment is able to provide users (players) with a battle game that is played using game contents. The following describes a battle card game that is played using game cards as one example of the game contents. Note that this game card serves as digital content, namely a virtual card used in a virtual space in the game.

<<<Battle Card Game>>>

The game system 1 according to the present embodiment is able to provide a battle card game that determines an outcome by allowing a character selected by a player to compete against an enemy character, i.e. an adversary.

In this battle card game, the player first selects a character to battle against the enemy character. In the present embodiment, the player is able to own a plurality of game cards (virtual cards used in a virtual space in the game), and the game cards are each associated with a game character. Thus, when the player selects a game card to be used in the battle from the game cards that the player owns, the character associated with the selected game card is set as the character (hereinafter referred to as "player character") to battle against the enemy character.

Next, a battle game is started in which the player character selected by the user battles against the enemy character. In the present embodiment, the setting is such that, when a player finds an enemy character through a search, the battle game is started by causing the enemy character to appear as an adversary against the player character.

Next, when the battle against the enemy character that has appeared is started, the player inputs a command to perform an attack. Then, the player character attacks the enemy character in accordance with the input command, and the enemy character performs a counter-attack to resist the attack. The determination of the outcome in the battle game of the present embodiment is made on the basis of a life parameter (hit point parameter) set for each character. Specifically, the control unit 11 of the server device 10 calculates the amount of damage the player character causes to the enemy character on the basis of the current values of parameters such as the level and attack power set for the player character, and then reduces the current value of the life parameter set for the enemy character in accordance with the damage. Subsequently, the control unit 11 calculates the amount of damage received by the player character from the counter-attack made by the enemy character to resist the attack on the basis of the current values of parameters such as the level and defense power set for the player character, and then reduces the current value of the hit point parameter set for the player character in accordance with the damage. In this way, the battle game according to the present embodiment is programmed so that as the value of the life parameter (hit point parameter) is reduced in accordance with the attack power of the adversary, and either the character whose life parameter value reaches zero first or the character whose remaining life parameter value at the end of the battle time period is smaller is defeated.

Furthermore, the battle card game according to the present embodiment can be a multiplayer battle game in which a plurality of players participate. More specifically, an enemy character that is common to various players is set as an adversary. Each player individually battles against the common enemy character. The value of the life parameter of the enemy character is reduced in accordance with attacks made by the player characters, and when the common enemy character performs a counter-attack to resist the attacks, the values of the hit point parameters of the player characters are reduced in accordance with the counter-attack. If the value of the life parameter of the enemy character reaches zero first, or if the remaining value of the life parameter of the enemy character is smaller than the remaining values of the hit point parameters of the player characters at the end of the battle time period, the player characters win the battle against the enemy character.

Note that at this time, a team (group) consisting of various players as members can be formed. In this case, a battle against an adversary, i.e. an enemy character, which is common to various players, is performed on a per-team basis.

<<<Game Card Compositing>>>

In this battle card game, by combining game cards (compositing game cards) that form a predetermined combination from among the owned cards that the player owns, it is possible to change various types of parameters (e.g., level, attack power, and defense power) of the character associated with the composited game card.

In the game card compositing according to the present embodiment, when game cards that form a predetermined combination are combined with each other, there are cases where the composited game card is advanced, and cases where the composited game card is enhanced.

Game card advancement is that the upper limit value of the parameter set for a combined game card, which is obtained by combining game cards of the same type with each other, is re-set to a new upper limit value.

In the card advancement according to the present embodiment, a game card of one type serving as a main card is combined with at least one game card of the same type serving as a sub card, and the upper limit value of the parameter such as the level, the attack power, or the defense power set for the main card is increased, and the increased value is set as the new upper limit value. This enables achieving greater advantages in owning redundant game contents of the same type.

A specific description of the case of advancing a game card by combining game cards of the same type will be given below with reference to FIG. 4.

As shown in FIG. 4, a game image 50 (operating screen) for allowing a player to advance a game card is displayed on the terminal display unit 24 of the user terminal 20. The player then places owned cards that he/she owns in an owned card area 51 by operating the terminal input unit 23. In the present embodiment, seven owned cards have been placed in the owned card area 51. By operating the terminal input unit 23, the player then selects two owned cards of the same type from among the seven owned cards displayed in the owned card area 51 (here, two "Character F" cards have been selected), determines one of them to be the main card, and determines the other one to be the sub card. When the owned card to be the main card is selected by the player, the selected owned card is placed in a pre-compositing card area 52. When the owned card to be the sub card is selected by the player, the selected owned card is placed in a pre-compositing card area 53. As a result, the state of the owned card that is to be generated after compositing is placed in a post-compositing card area 54. The player then checks that the owned cards of the same type are displayed in the pre-compositing card areas 52 and 53, checks the owned card that is to be generated after compositing in the post-compositing card area 54, and then selects an advance card button 55. By allowing the player to perform this operation input, a sub card is combined with a main card of the same type, and an advanced main card is generated. Note that a specific processing procedure for advancing a game card will be described in detail later.

In game card enhancement, game cards that form a predetermined combination are combined with each other, and the current value of the parameter set for the combined game card is changed.

In the card enhancement according to the present embodiment, at least one game card that is to be the sub card is combined with a game card that is to be the main card, the current value of the parameter such as the level, the attack power, or the defense power set for the main card is increased, and the increased value is set as the new current value. Note that game cards of different types may be combined as the main card and the sub card, game cards of the same type may be combined, and at least two game cards of the same type may be combined with at least one game card of a different type.

A specific description of the case of enhancing a game card by combining game cards of different types will be given below with reference to FIG. 5.

As shown in FIG. 5, a game image 60 (operating screen) for allowing a player to enhance a game card is displayed on the terminal display unit 24 of the user terminal 20. The player then places owned cards that he/she owns in an owned card area 61 by operating the terminal input unit 23. In the present embodiment, seven owned cards have been placed in the owned card area 61. By operating the terminal input unit 23, the player then selects a plurality of owned cards from among the seven owned cards displayed in the owned card area 61, determines one of them to be the main card, and determines the others to be the sub cards. Here, it is assumed that three owned cards of different types are selected by the player (here, "Character A", "Character B", and "Character C" have been selected), one of them is determined to the main card ("Character A"), and the remaining two are determined to be the sub cards ("Character B" and "Character C"). When the owned card to be the main card is selected by the player, the selected owned card is placed in a pre-compositing card area 62. When the owned cards to be the sub cards are selected by the player, the selected owned cards are placed in pre-compositing card areas 63 and 64. As a result, the state of the owned card that is to be generated after compositing is placed in a post-compositing card area 65. The player then checks that the owned cards of different types are displayed in the pre-compositing card areas 62 to 64, checks the owned card that is to be generated after compositing in the post-compositing card area 65, and then selects an enhance card button 66. By allowing the player to perform this operation input, two sub cards are combined with one main card, and an enhanced main card is generated. Note that a specific processing procedure for enhancing a game card will be described in detail later.

<<<Data Structure>>>

The various types of information used in the game system 1 of the present embodiment will be described below with reference to FIGS. 6 to 8. FIG. 6 illustrates an example of the data structure of card information. FIG. 7 illustrates an example of the data structure of user information. FIG. 8 illustrates an example of the data structure of owned card information. At least card information, user information, and owned card information are stored in the data storage unit 12 of the server device 10 in the present embodiment.

<Card Information>

The card information includes a card ID as one example of identification information for identifying a game card, and various types of information related to the game card associated with the card ID. For example, as shown in FIG. 6, the card information includes, for example, the name of the character associated with the game card, a character image, a rarity, and various types of initial parameters such as a level upper limit value per advancement, an attack power upper limit value per advancement, and a defense power upper limit value per advancement.

The characters are named according to their character types, and they allow the user to identify the types of characters. As shown in FIG. 6, in the present embodiment, warrior characters such as "Warrior A" and "Warrior B" and wizard characters such as "Wizard Z" are set as the types of characters (types of game cards). Specifically, the third digit of the card ID is set to "0" for warrior characters. The third digit of the card ID is set to "5" for wizard characters. The character images are character-related image data. Play images that include characters based on this image data are displayed on the screen, thus allowing the user to recognize the types of characters.

The rarity is a parameter indicating how rare a character is. In the present embodiment, four levels of rarity (common, uncommon, rare, and super rare) can be set for a character. The user can progress through the battle game with an advantage by owning a character (game card) with a high rarity. As shown in FIG. 6, in the present embodiment, the last digit of the card ID is set to "1" if the rarity is "common". The last digit of the card ID is set to "2" if the rarity is "uncommon". The last digit of the card ID is set to "3" if the rarity is "rare". The last digit of the card ID is set to "4" if the rarity is "super rare".

The level upper limit value is data indicating the new upper limit value of the level (parameter) to be re-set for an advanced game card (character). This level upper limit value is set individually for each time the game card is advanced (number of advancements).

The attack power upper limit value is data indicating the new upper limit value of the attack power (parameter) to be re-set for an advanced game card (character). This attack power upper limit value is set on a per-advancement basis.

The defense power upper limit value is data indicating the new upper limit value of the defense power (parameter) to be re-set for an advanced game card (character). This defense power upper limit value is set on a per-advancement basis.

As shown in FIG. 6, in the present embodiment, the number of advancements is set such that a game card can be advanced up to three times, and the upper limit values of the level, attack power, and defense power parameters are increased in steps. In this way, limiting the number of advancements enables suppressing the excessive combining of game cards of the same type, and enables achieving greater advantages in owning redundant game cards of the same type within a limited extent.

Note that the card information additionally includes data indicating initial skill values set for the characters, examples of which include various types of initial parameters such as an initial level, an initial attack power, and an initial defense power.

<User Information>

The user information includes a user ID as one example of identification information for identifying a user (player), and various types of information related to the user associated with the user ID. For example, as shown in FIG. 7, the user information includes user IDs, friend user IDs, virtual currency, owned card information, and the like.

Friend user IDs are information indicating other users (players) who have been registered on a friend list of the user. That is to say, the larger the number of friend user IDs, the larger the number of other users with whom the user has become friends. The friend user IDs are updated when the user registers other users on the friend list, and when the user deletes other users who have already been registered from the friend list.

The virtual currency is information indicating the amount of virtual currency owned by the user (player). The virtual currency is updated when the user earns or spends virtual currency.

The owned card information is information indicating owned cards that are owned by the user (player). The owned card information includes owned card IDs indicating cards owned by the user and various types of information related to the owned cards associated with the owned card IDs.

For example, as shown in FIG. 8, the owned card information includes owned card IDs and various types of parameters such as the level (current value and upper limit value), the attack power (current value and upper limit value), and the defense power (current value and upper limit value) of the characters associated with the game cards that have the owned card IDs.

The various types of parameters such as level, attack power, and defense power are data indicating skill values set for the characters.

The level is data indicating the degrees of strength of the characters associated with the game cards that have the owned card IDs. The level current value is data indicating the value of the level set for the character at the current point in time. The level upper limit value is data indicating the upper limit value of the level set for the character at the current point in time.

The attack power is data indicating the attack strength of the characters associated with the game cards that have the owned card IDs. The attack power current value is data indicating the value of the attack power set for the character at the current point in time. The attack power upper limit value is data indicating the upper limit value of the attack power set for the character at the current point in time.

The defense power is data indicating the defense strength of the characters associated with the game cards that have the owned card IDs. The defense power current value is data indicating the value of the defense power set for the character at the current point in time. The defense power upper limit value is data indicating the upper limit value of the defense power set for the character at the current point in time.

The current values of the level and the like are changed and updated according to the results of battle games and the extent of game progression. The upper limit values of the level and the like are also changed and updated when game cards are advanced (card advancement is performed).

The following is a specific description of an example of operations of the game system 1 according to the present embodiment using the above-described types of information.

<<<Operation of Game System 1>>>

The following describes operations in the game system 1. In the game system 1 according to the present embodiment, control targets are controlled and various processes are executed by causing the server device 10 and the user terminal 20 to cooperate based on a game program.

Specifically, a card offer process, a card recording process, a card advancement process, a card enhancement process, and the like are executed in this game system 1. These processes will be described below.

<Card Offer Process>

The card offer process is a process for offering a player (user) with a game card. In the present embodiment, a player is offered with a game card by executing a battle card game. Specifically, the offer unit 111 in the server device 10 executes a game process related to a battle card game and determines a game card that a player is to be offered with based on the battle content and the battle result.

First, the player displays a web page accessed in order to start a battle game on the terminal display unit 24 of the user terminal 20, and starts the battle game by operating the terminal input unit 23. That is to say, when the terminal control unit 21 receives an input signal to start a battle from the terminal input unit 23, the terminal control unit 21 sets the user ID in a command (battle start request) to start the battle game, and transmits the command to the server device 10 via the terminal communication unit 25.

The player at this time can select a game card, in other words, select the character associated with the game card, to be used in the battle game. The character selected by the player becomes the character to battle against the enemy character in the virtual space in the game. In other words, when the character (referred to hereinafter as the player character) is selected by the player operating the terminal input unit 23, the terminal control unit 21 reads out the card ID of the game card corresponding to the selected player character from the terminal storage unit 22 and transmits the read card ID and the user ID to the server device 10 via the terminal communication unit 25.

Next, when the server device 10 receives the battle start request with the set user ID via the network, the server device 10 determines an enemy character that is to battle the player character.

Next, when the enemy character is determined, the server device 10 performs a battle game process for determining the outcome of the battle game between the characters. Specifically, the control unit 11 (offer unit 111) acquires parameters such as the attack power, the defense power, and the hit points set for the player character based on the owned card information stored in the data storage unit 12. Parameters such as the attack power, the defense power, and the life (HP) set for the enemy character are also acquired.

The control unit 11 (offer unit 111) then calculates the amount of damage the player character causes to the enemy character on the basis of the parameters such as the attack power and the defense power set for the player character, and then reduces the life parameter set for the enemy character in accordance with the damage. Similarly, the control unit 11 calculates the amount of damage the enemy character causes to the player character on the basis of the parameters such as the attack power and the defense power set for the enemy character, and then reduces the hit point parameter set for the player character in accordance with the damage.

When the control unit 11 (offer unit 111) judges that the life parameter of the enemy character has reached zero first as a result of this calculation, it is determined that the enemy character is defeated (the player character has won). When the control unit 11 judges that the hit point parameter of the player character has reached zero first, it is determined that the player character is defeated (the enemy character has won).

After the outcome of the battle game is determined in this way, the control unit 11 (offer unit 111) selects, based on the battle content and the battle results, a game card that the player is to be offered with from among the plurality of game cards included in the card information shown in FIG. 6. As a result, the selected offer card becomes an owned card that the player owns.

<Card Recording Process>

The card recording process is a process by which an offer card that a player was offered with in the card offer process is recorded as an owned card that the player owns. The recording unit 112 of the server device 10 records that was offered to the player in the card offer process by adding the offer card to the owned card information shown in FIG. 8. Specifically, the CPU records the offer card as an owned card by writing information regarding the offer card in a storage area of a memory. Note that the CPU may record the offer card as an owned card by setting flag information for the card ID associated with the offer card (setting a flag that indicates ownership).

<Card Advancement Process>

The card advancement process is a process for advancing a game card by combining game cards of the same type.

Specifically, first, upon receiving a command requesting card advancement (card advancement request) from the user terminal 20, the control unit 11 of the server device 10 starts the card advancement process (step S101).

Next, according to the present embodiment, the control unit 11 of the server device 10 causes the image generation unit 115 to generate a game image (see FIG. 4) that is to be displayed on the terminal display unit 24 of the user terminal 20, and transmits the generated game image to the user terminal 20 (step S102).

The terminal control unit 21 of the user terminal 20 displays the received game image (see FIG. 4) on the terminal display unit 24 (step S103), and allows the player to select game cards that form a predetermined combination (step S104). The player selects a plurality of game cards of the same type from among a plurality of owned cards (e.g., selects two owned cards) by operating the terminal input unit 23. At this time, the player determines one of the game cards to be the main card, and determines the other game card to be the sub card. The terminal control unit 21 receives an operation signal for selecting game cards from the terminal input unit 23, and then transmits the card IDs of the game cards of the same type that were selected by the player (main card and sub card) to the server device 10, as well as transmits a command requesting the setting of parameter upper limit values (upper limit setting request) to the server device 10.

Next, the server device 10 receives the upper limit setting request and performs an upper limit setting process for setting new upper limit values for parameters of the main card out of the game cards of the same type that were selected by the player (one main card and one sub card) (step S105).

Specifically, first, the upper limit setting unit 113 of the server device 10 determines whether the main card and the sub card that were selected by the player are game cards of the same type, based on the card IDs of the game cards. As shown in FIG. 6, in the present embodiment, the game cards that have the card IDs 0001 to 0004 are set as game cards of the same type, namely the character name "Warrior A". Also, the game cards that have the card IDs 2591 to 2594 are set as game cards of the same type, namely the character name "Wizard Z". In other words, the game cards that have the card IDs 0001 to 0004 (Warrior A) and the game cards that have the card IDs 2591 to 2594 (Wizard Z) are set as game cards of different types. In this way, the upper limit setting unit 113 determines whether the main card and the sub card are game cards of the same type or cards of different types based on the card IDs of the game cards. Next, in the case of determining that the main card and the sub card are game cards of the same type, the upper limit setting unit 113 acquires upper limit values that correspond to the number of advancements for the level, attack power, and defense power parameters that have been set for the main card by referencing the card information stored in the data storage unit 12 using the card ID of the main card as the key. The upper limit setting unit 113 then performs updating by recording the acquired level, attack power, and defense power upper limit values as new upper limit values of the main card in the owned card information (see FIG. 8). At this time, the sub card is deleted from the owned card information (see FIG. 8) (or a flag indicating non-ownership is set), and therefore the player owns only the main card for which new parameter upper limit values were set after card advancement.

In this way, the upper limit values of parameters (level, etc.) set for game cards of the same type can be re-set to new upper limit values, and therefore even the case where the player owns redundant game cards of the same type can be advantageous in game progression through card advancement. As a result, it is possible to achieve greater advantages in owning redundant game cards of the same type.

Next, the server device 10 performs a parameter increasing process for increasing the current values of the parameters of the main card whose parameter upper limit values were set to new upper limit values (step S106). Specifically, the parameter increasing unit 114 of the server device 10 acquires the current values of the level, attack power, and defense power parameters set for the main card by referencing the owned card information stored in the data storage unit 12 using the card ID of the main card as the key. The parameter increasing unit 114 then calculates new current values by adding predetermined values to the current values of the various parameters, and performs updating by recording the new current values in the owned card information (see FIG. 8).

In this way, the current values of parameters (level, etc.) set for game cards of the same type can be increased, and therefore it is possible to achieve even greater advantages in owning redundant game cards of the same type.

Next, the control unit 11 of the server device 10 causes the image generation unit 115 to generate a game image that indicates that the game cards of the same type selected by the player were advanced (indicates that the upper limit values of the parameters of the main card were re-set to new upper limit values), and transmits the generated game image to the user terminal 20 (step S107).

By displaying the received game image on the terminal display unit 24, the terminal control unit 21 of the user terminal 20 can inform the player that the selected game cards of the same type were advanced (that the upper limit values of the parameters of the main card were re-set to new upper limit values) (step S108).

Note that in the above-described upper limit setting process, the upper limit setting unit 113 may control so that the higher the current values of the parameters set for the main card are, the more the new upper limit values of the parameters that are to be re-set for the main card increase. For example, the new level upper limit value that is to be re-set for the main card is higher in the case of card advancement when the current value of the level set for the main card is 100 than in the case of card advancement when the current value of the level set for the main card is 10. Accordingly, even if the player comes to own redundant game cards of the same type, the player will hold the game cards of the same type until the current values of the parameters increase. For this reason, it is possible to achieve even greater advantages in owning redundant game cards of the same type.

<Card Enhancement Process>

The card enhancement process is a process for changing the current values of the parameters set for a combined game card obtained by combining game cards that form a predetermined combination. The following description takes the example of the case where the card enhancement process is performed so as to enhance a main card whose parameter upper limit values were set to new upper limit values through the above-described card advancement process (referred to hereinafter as the "advanced main card").

Specifically, first, upon receiving a command requesting card enhancement (card enhancement request) from the user terminal 20, the control unit 11 of the server device 10 starts the card enhancement process (step S201).

Next, according to the present embodiment, the control unit 11 of the server device 10 causes the image generation unit 115 to generate a game image (see FIG. 5) that is to be displayed on the terminal display unit 24 of the user terminal 20, and transmits the generated game image to the user terminal 20 (step S202).

The terminal control unit 21 of the user terminal 20 displays the received game image (see FIG. 5) on the terminal display unit 24 (step S203), and allows the player to select game cards that form a predetermined combination (step S204). Here, the player selects a plurality of game cards of different types from among a plurality of owned cards (e.g., selects three owned cards of different types) by operating the terminal input unit 23. At this time, the player determines the advanced main card as the main card again, and determines the game cards of different types from the advanced main card as the sub cards. The terminal control unit 21 receives an operation signal for selecting game cards from the terminal input unit 23, and then transmits the card IDs of the game cards that were selected by the player (one main card and two sub cards) to the server device 10, as well as transmits a command requesting the increasing of the current values of parameters (parameter increasing request) to the server device 10.

Next, the server device 10 receives the parameter increasing request and performs a parameter increasing process for increasing the current values of the parameters of the main card among the game cards of different types that were selected by the player (one main card and two sub cards) (step S205).

Specifically, first, the parameter increasing unit 114 of the server device 10 judges whether the main card (advanced main card) and the sub cards are game cards of the same type, based on the card IDs of the game cards. This judgment is performed using the same method as that in the above-described card advancement processing. Next, in the case of judging that the main card and the sub cards are game cards of different types, the parameter increasing unit 114 acquires the current values of the level, attack power, and defense power parameters that have been set for the main card by referencing the card information stored in the data storage unit 12 using the card ID of the main card as the key. The parameter increasing unit 114 then calculates new current values by adding predetermined values to the current values of the various parameters, and performs updating by recording the new current values in the owned card information (see FIG. 8). At this time, the sub cards are deleted from the owned card information (see FIG. 8) (or a flag indicating non-ownership is set), and therefore the player owns only the main card (advanced main card) for which new parameter current values were set after card enhancement.

In this way, when the advanced main card is enhanced through the card enhancement process, not only are new upper limit values set for the parameters (level, etc.) through the above-described card advancement process, but also the current values of the parameters (level, etc.) can be increased by using sub cards of different types. For this reason, it is possible to achieve even greater advantages in owning redundant game cards of the same type.

Next, the control unit 11 of the server device 10 causes the image generation unit 115 to generate a game image that indicates that the advanced main card owned by the player was enhanced (indicates that new current values were set for the parameters of the advanced main card), and transmits the generated game image to the user terminal 20 (step S206).

By displaying the received game image on the terminal display unit 24, the terminal control unit 21 of the user terminal 20 can inform the player that the advanced main card was enhanced (that new current values were set for the parameters of the advanced main card) (step S207). Note that in the above-described parameter increasing process, the parameter increasing unit 114 may determine the amounts of increase in the current values of the parameters (level, etc.) set for the main card (advanced main card) based on the current values of the parameters (level, etc.) set for the sub cards. Accordingly, the amounts of increase in the parameters set for the main card (advanced main card) can be determined in accordance with the current values of the parameters set for the sub cards of different types, thus making it possible to achieve even greater advantages in owning redundant game cards of the same type.

As described above, according to the game system 1 of the present embodiment, a main card and a sub card set to the same type as the main card are selected from among a plurality of game cards that the player owns, and the upper limit values of the parameters (level, etc.) set for the main card can be re-set to new upper limit values by combining the main card with the sub card. For this reason, even if the player owns redundant game cards of the same type, the parameters set for the game cards of the same type can be further increased. As a result, it is possible to achieve greater advantages in owning redundant game cards of the same type.

Other Embodiments

The present embodiment facilitates understanding of the present invention and does not intend to limit the interpretation of the present invention. Variations and modifications may be made in accordance with the spirit and scope of the present invention, and equivalents thereof are included in the present invention. In particular, the embodiments described below are to be included in the present invention.

<Card Offer Process>

The above embodiment has described the example of a battle card game as one example of the card offer process. However, the present invention is not limited to this embodiment. For example, the player may be offered with a game card selected at random by playing a lottery game. Also, a game card may be offered when a mission given to the player is cleared. Furthermore, a game card may be offered when the player (user) inputs a serial code displayed on a web page or the like. Moreover, a game card may be offered when the player logs in to the game system 1.

Also, although the above embodiment has described the case where a player is offered with a game card, the present invention is not limited to this embodiment. A team (group) consisting of various players as members may be offered with a game card.

<Card Advancement/Enhancement>

Although the above embodiment is described taking the example of the case of advancing a game card by combining two game cards of the same type and the case of enhancing a game card by combining three game cards of different types, the present invention is not limited to this embodiment. For example, a game card may be advanced by combining three or more game cards of the same type. Also, a game card can be advanced and/or enhanced by combining a plurality of game cards of the same type with a plurality of game cards of different types. For example, a game card may be advanced and/or enhanced by combining three game cards of the same type with two game cards of different types (combining a total of five game cards).

Also, in the above embodiment, a case of increasing the upper limit values and the current values of the level, attack power, and defense power parameters set for a game card in game card advancement and enhancement has been described. However, the present invention is not limited to this embodiment. A configuration is possible in which the upper limit value and the current value of any of the level, attack power, and defense power parameters are increased. Also, the upper limit value and current value of a parameter other than the level, attack power, and defense power parameters may be increased.

<Server Device>

The above embodiment is described taking the example of the game system 1 that includes one server device 10 as an example of a server device. However, the present invention is not limited to this embodiment, and may be applied to a game system 1 that includes a plurality of server devices 10 as examples of server devices. In other words, a configuration is possible in which a plurality of server devices 10 are connected via a network 2, and the execution of various types of processes is distributed among the server devices 10.

<Information Processing Device>

The above embodiment is described taking the example of the case where various processes such as the card offer process, the card recording process, the card advancement process, and the card enhancement process are executed in the game system 1 by causing the server device 10 and the user terminal 20 to cooperate based on a game program. However, the present invention is not limited to this embodiment, and a configuration is possible in which the above-described processes are executed based on a game program by solely the user terminal 20 serving as the information processing device, or by solely the server device 10 serving as the information processing device.

What is claimed is:

1. A computer-readable storage medium non-transitorily storing a game program for causing a computer that includes a processor and a memory to execute a game played by a player using a game content for which a parameter that can be increased to an upper limit value is set, the game program causing the computer to perform the following processes:

an offer process of offering the player with the game content;

a recording process of recording the offered game content as an owned game content that the player owns, and storing a current value and an upper limit value of a parameter set for the owned game content;

an upper limit setting process of selecting one owned game content and another owned game content set to the same type as the one owned game content from among a plurality of owned game contents that the player owns, and re-setting the upper limit value of the parameter set for the one owned game content to a new upper limit value by combining the one owned game content with the other owned game content of the same type; and a parameter increasing process of selecting another owned game content set to a different type from the one owned game content from among a plurality of owned game contents that the player owns, and increasing a current value of the parameter set for the one owned game content between the current value and the upper limit value by combining the one owned game content with the other owned game content of a different type.

2. A computer-readable storage medium according to claim 1, wherein the game program causes the computer to execute:

a process of determining an amount of increase in the parameter of the one owned game content based on a current value of the parameter of the other owned game content set to a different type in the parameter increasing process.

3. A computer-readable storage medium according to claim 1, wherein the game program causes the computer to execute:

a process of increasing a current value of the parameter of the one owned game content when the upper limit value of the parameter of the one owned game content is re-set to the new upper limit value due to execution of the upper limit setting process.

4. A computer-readable storage medium according to claim 1, wherein in the game program, the number of times that the one owned game content can be combined with another owned game content set to the same type as the one owned game content is limited to a predetermined number of times or less.

5. A computer-readable storage medium according to claim 1, wherein the game program causes the computer to execute:

a process of performing control so that the higher the current value of the parameter set for the one owned game content is, the more the new upper limit value of the parameter to be re-set for the one owned game content increases in the upper limit setting process.

6. An information processing device for executing a game played by a player using a game content for which a parameter that can be increased to an upper limit value is set, comprising:

an offer unit that offers the player with the game content;

a recording unit that records the offered game content as an owned game content that the player owns, and stores a current value and an upper limit value of a parameter set for the owned game content;

an upper limit setting unit that selects one owned game content and another owned game content set to the same type as the one owned game content from among a plurality of owned game contents that the player owns, and re-sets the upper limit value of the parameter set for the one owned game content to a new upper limit value by combining the one owned game content with the other owned game content of the same type; and a parameter increasing unit that selects another owned game content set to a different type from the one owned game content from among a plurality of owned game contents that the player owns, and increases a current value of the parameter set for the one owned game content between the current value and the upper limit value by combining the one owned game content with the other owned game content of a different type.

* * * * *